United States Patent [19]

Danyu

[11] Patent Number: 4,830,670
[45] Date of Patent: May 16, 1989

[54] ERASABLE BALLPOINT-PEN INK BEFORE BEING CURED

[76] Inventor: Jackson M. Danyu, 8, Lane 12, Hsi Ning North Rd., Taipei, Taiwan

[21] Appl. No.: 63,360

[22] Filed: Jun. 18, 1987

[51] Int. Cl.$^4$ ............................................. C09D 11/10
[52] U.S. Cl. ........................................ 106/23; 106/22; 260/DIG. 38; 523/161; 524/88; 524/197
[58] Field of Search ............................. 106/20, 22, 23; 260/DIG. 38; 523/161; 524/88, 195, 87

[56] References Cited

U.S. PATENT DOCUMENTS 2,882,172  4/1959  Scobel ................................... 106/22
4,212,676  7/1980  Ueda ..................................... 106/272
4,525,216  6/1985  Nakanishi ............................. 106/30

OTHER PUBLICATIONS

Derwent Abstract Accession No. 85-007368/02, German Pat. No. DE3323845, Jan. 3, 1985.
Derwent Abstract Accession No. 86-085949/13, Japanese Pat. No. J61034080, Feb. 18, 1986.

Primary Examiner—Amelia Burgess Yarbrough
Attorney, Agent, or Firm—Varndell Legal Group

[57] ABSTRACT

This invention relates to an erasable ballpoint pen ink before being cured, especially one which can be easily erased by using an eraser directly after it is written on paper, but which, after a longer period of time, becomes cured. The erasable ballpoint pen ink comprises an alcohol soluble pigment, a carrier, solvent and glycerol in such a way that the above mentioned components are in the weight-percentage ratio as follows, when the total weight of the ink is 100%: alcohol soluble pigment 10-20%, carrier 40-70%, solvent 15-35%, and glycerol 3-15%.

11 Claims, 1 Drawing Sheet

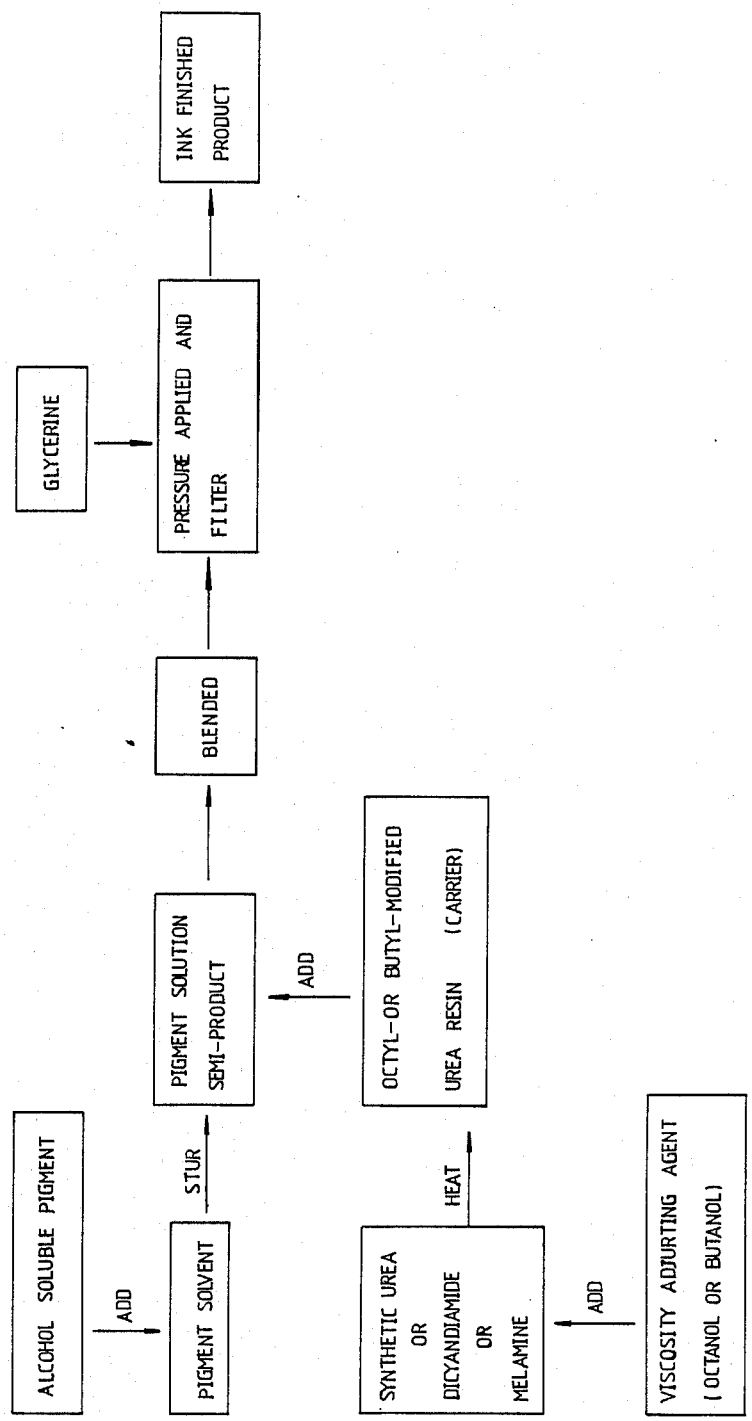

ERASABLE BALLPOINT-PEN INK BEFORE BEING CURED

BACKGROUND AND SUMMARY OF THE INVENTION

The writing produced from the convenient ballpoint pen available in the market is not erasable by using the common eraser. Therefore, it is very inconvenient to use the conventional ballpoint pen if there is a slip of the pen which needs to be corrected or deleted. And if some special eraser, which can scrape the paper surface off, is to be used, then the paper surface will be damaged. As to the use of a chemical ink remover, such are usually toxical, and unhealthful to human beings.

It is well-known that paper is made of cellulose fibers which has capillary attraction. The ink used in the conventional ballpoint pen consists of oily dyestuffs, or oily precipitated pigments, which diffuse into the carriers, such as: mineral oils, fatty oils, or alcohols with polyethylene bases or resins with chloro-polyethylene bases; besides it also consists of polyethylene glycol which is to be used as viscosity adjusting agent.

For example, the composition of the U.S. Pat. No. 2,882,172 ballpoint pen ink is as follows:

| Components | Wt. % |
| --- | --- |
| Victoria blue oleate | 56 |
| Victoria blue phorpho-tungstic toner | 27 |
| "Crill" 5.6 | 2 |
| "Carbowax" 1500 | 8 |
| Polyethylene glycol 400 | 7 |

The above listed components, after being thoroughly mixed, can be used as the material for making the ballpoint pen ink. However, the characteristics of this kind of ballpoint pen ink is: very quick in drying and very strong in permeability. When this kind of ink is written on paper, it is quickly absorbed by the capillary tubes within the paper sheets, and will be cured and dried very quickly. The reslt will be such that the ink can not be erased even immediately after it has been written on the paper. This is a major defect when a slip of the pen in the document has to be corrected. Besides, this kind of the ink will not smoothly and continuously be written onto the paper through the ballpoint pen, and the problem of leakage.

For this reason, the inventor studied earnestly and developed this invention of an improved formula for the ballpoint pen ink, characterized by using some high-boiling. points (188.2° C. and 198° C. respectively) organic compounds, such as a propylene glycol or hexylene glycol, as pigment solvent, which, under room temperature, can be maintained in a liquid state and its viscosity will not be greatly affected by a change of temperature. Therefore, no permeability defect will occur, so that the components of the ink, especially the pigment, will not be absorbed into the capillary tubes of the paper sheets and, thus, the ink can be easily erased by the common eraser.

The components of the erasable ballpoint pen ink of this invention are listed as follows:

| | |
| --- | --- |
| Alcohol soluble pigments, about | 10–20% by wt. |
| Carrier, about | 40–70% by wt. |
| Solvent, about | 15–35% by wt. |
| Glycerol, about | 3–15% by wt. |

DETAILED DESCRIPTION OF THE PREFERRED EMBODIMENT

The alcohol soluble pigments used in this invention, is in proportion to the total weight of the ink. For example, in the case of manufacturing the blue color ink, an alcohol soluble pigment which can be used is ferric ferrocyanide ($Fe_4[Fe(CN)_6]_3$), which is also popularly called as Prussian blue. Another alcohol soluble pigment which can be used in manufacturing blue ink is phthalocyanine blue. In some cases, an alcohol soluble dyestuff can be used instead of alcohol pigment, for instance, victoria blue. The grain size of the pigment or dyestuff is about 0.01–5 micron ($\mu$). The size most preferred is about 0.010–0.015$\mu$.

In the case of manufacturing red ink, organic red can be used. In the case of manufacturing green or black colored ink, phthalocyanine green or carbon black can be used respectively.

The carrier used in this invention is in a suitable proportion to the total weight of the ink. The organic compounds, which can be used as carrier, include ortyl-modified urea resin, butyl-modified urea resin, octyl- or butyl-modified dicyandiamide, or octyl- or butyl-modified melamine.

The weight percentage of the pigment solvent propylene glycol used in this invention is 15–35% of the total weight of the ink. The preferred percentage will be about 18–22%. The propylene glycol can also be replaced by hexylene glycol.

The glycerol used in this invention is in a suitable proportion to the total weight of the ink.

In order to explain it more clearly, the following example is illustrated. But it should be pointed out that the scope of this invention is not limited to this example.

(EXAMPLE)

(1) A suitable percentage of the pigment is taken out and is to be put into the propylene glycol or hexylene glycol. Start mixing by means of a mixer having a rotational speed of about 90–100 r.p.m. Heat the mixture to a temperature of about 75° C.–85° C. within a time of 50–70 minutes, until it is totally and uniformly dissolved. After the pigment solution has been cooled down to 45° C.–55° C., add the intermediate product of the modified resin from the step (2).

(2) The octyl-modified urea resin or butyl-modified urea resin is processed by adding octanol or butanol into synthetic urea dicyandiamide or melamine or into a mixture of dicyandiamide and melamine; and by means of the reflux-condenser, they are heated to 90°–100° C. After they has been mixed at a temperature of about 60°–70° C. for 40 minutes, the intermediate product of the modified resin will be formed.

(3) The intermediate product of the modified resin from the step (2), is added to the intermediate product from the step (1). After the above mentioned two intermediate products have been thoroughly mixed, glycerol is added and the mixture is subjected to the pressure filter treatment, then the product of the ballpoint pen ink of this invention will be obtained.

| (4) Formula: | |
| --- | --- |
| Carbon black | 15 g. |
| Propylene glycol | 20 g. |
| Carrier (e.g. Melamine resin) | 60 g. |
| Octanol | 5 g. |
| Glycerol | 5 g. |

The black color ballpoint pen ink so obtained can be easily erased, after it has been written down for a short time, without damaging the paper. In the above formula, the carbon black can be replaced by the pigments such as phthalocyanine blue or phthalocyanie green, and the propylene glycol can be replaced by hexylene glycol. There are many kinds of carriers to be selected and used such as: octyl-modified urea resin, butyl-modified urea resin, dicyandiamide, or one kind of the melamine resins or the mixture of several kinds of the melamine resins.

I claim:

1. A ballpoint pen ink composition capable of being easily erased from paper, which consists essentially of an alcohol soluble pigment; a carrier selected from the group consisting of octyl-modified urrea resin, butyl modified urea resin, dicyandiamide resin and melamine; a solvent selected from the group consisting of propylene glycol and hexylene glycol; and glycerol, all in a suitable proportion to a total weight of the ink composition.

2. The ballpoint pen ink composition of claim 1, including 10-20 wt % of said alcohol soluble pigment, 40-70 wt % of said carrier, 15-35 wt % of said solvent, and 3-15 wt % of said glycerol.

3. The ballpoint pen ink composition of claim 1, consisting of 10-20 wt % of said alcohol soluble pigment, 40-70 wt % of said carrier, 15-35 wt % of said solvent, and 3-15 wt % of said glycerol.

4. The ballpoint pen ink composition of claim 2, wherein said alcohol soluble pigment is selected from the group consisting of organic red, prussian blue, phthalocyanine blue, victoria blue and phthalocyanine green.

5. The ballpoint pen ink composition of claim 3, wherein said alcohol soluble pigment is selected from the group consisting of organic red, prussian blue, phthalocyanine blue, victoria blue and phthalocyanine green.

6. A ballpoint ink composition capable of being easily erased from paper, prepared by the steps comprising:
   (1) preparing a mixture by adding an alcohol soluble pigment to a solvent selected from the group consisting of propylene glycol and hexylene glycol, mixing and heating said mixture until said alcohol soluble pigment is totally and uniformly dissolved, and cooling the resulting mixture.
   (2) preparing a carrier selected from the group consisting of octyl-modified urea resin, butyl-modified urea resin, dicyandiamide resin, and melamine,
   (3) adding the mixture resulting form step (1) to said carrier and mixing, and _
   (4) adding glycerol to the product resulting from step (3) and subjecting the resulting glycerol-containing mixture to a pressure filter treatment.

7. The ballpoint ink composition of claim 6, having 10-20 wt % of said alcohol soluble pigment, 40-70 wt % of said carrier, 15-35 wt % of said solvent, and 3-15 wt % of said glycerol.

8. The ballpoint ink composition of claim 7, wherein said carrier is prepared by adding one of octanol and butanol to urea resin, and heating the resulting mixture in a reflux condenser.

9. The ballpoint ink composition of claim 6, wherein said alcohol soluble pigment is selected from the group consisting of organic red, prussian blue, phthalocyanine blue, victoria blue and phthalocyanine green.

10. The ballpoint ink composition of claim 7, wherein said alcohol soluble pigment is selected from the group consisting of organic red, prussian blue, phthalocyanine blue, victoria blue and phthalocyanine green.

11. The ballpoint ink composition of claim 8, wherein said alcohol soluble pigment is selected from the group consisting of organic red, prussian blue, phthalocyanine blue, victoria blue and phthalocyanine green.

* * * * *